US008215542B2

(12) United States Patent
Rochelle et al.

(10) Patent No.: US 8,215,542 B2
(45) Date of Patent: Jul. 10, 2012

(54) METHOD AND SYSTEM FOR MAKING A CHANGE OF ADDRESS

(75) Inventors: Robert B. Rochelle, Fort Worth, TX (US); Janusz R. Pieniadz, Arlington, TX (US); Jürgen Zehren, Constance (DE)

(73) Assignee: Siemens Industry, Inc., Alpharetta, GA (US)

( * ) Notice: Subject to any disclaimer, the term of this patent is extended or adjusted under 35 U.S.C. 154(b) by 319 days.

(21) Appl. No.: 12/572,360

(22) Filed: Oct. 2, 2009

(65) Prior Publication Data

US 2010/0102116 A1 Apr. 29, 2010

Related U.S. Application Data

(60) Provisional application No. 61/102,403, filed on Oct. 3, 2008.

(51) Int. Cl.
*G06F 17/00* (2006.01)

(52) U.S. Cl. ........................................ 235/375; 235/380

(58) Field of Classification Search .................. 235/375, 235/380

See application file for complete search history.

(56) References Cited

U.S. PATENT DOCUMENTS

| | | | | |
|---|---|---|---|---|
| 5,422,821 | A | 6/1995 | Allen et al. | |
| 5,703,783 | A | 12/1997 | Allen et al. | |
| 2005/0021856 | A1 | 1/2005 | Basile et al. | |
| 2011/0007364 | A1 * | 1/2011 | Brundage et al. | 358/3.28 |

* cited by examiner

*Primary Examiner* — Karl D. Frech

(57) ABSTRACT

The invention in one aspect consolidates COA reject data to a central location and provides reports and queries that allow analysis of this data and to answer customer complaints as to why their change was not processed. In another aspect the invention provides an improved process for handling of the printed or handwritten COA forms. A paper COA form is generated by hand or use of the USPS online COA system. The paper form includes indicia such as a bar code which aids in determining the contents of the form when it is scanned.

13 Claims, 4 Drawing Sheets

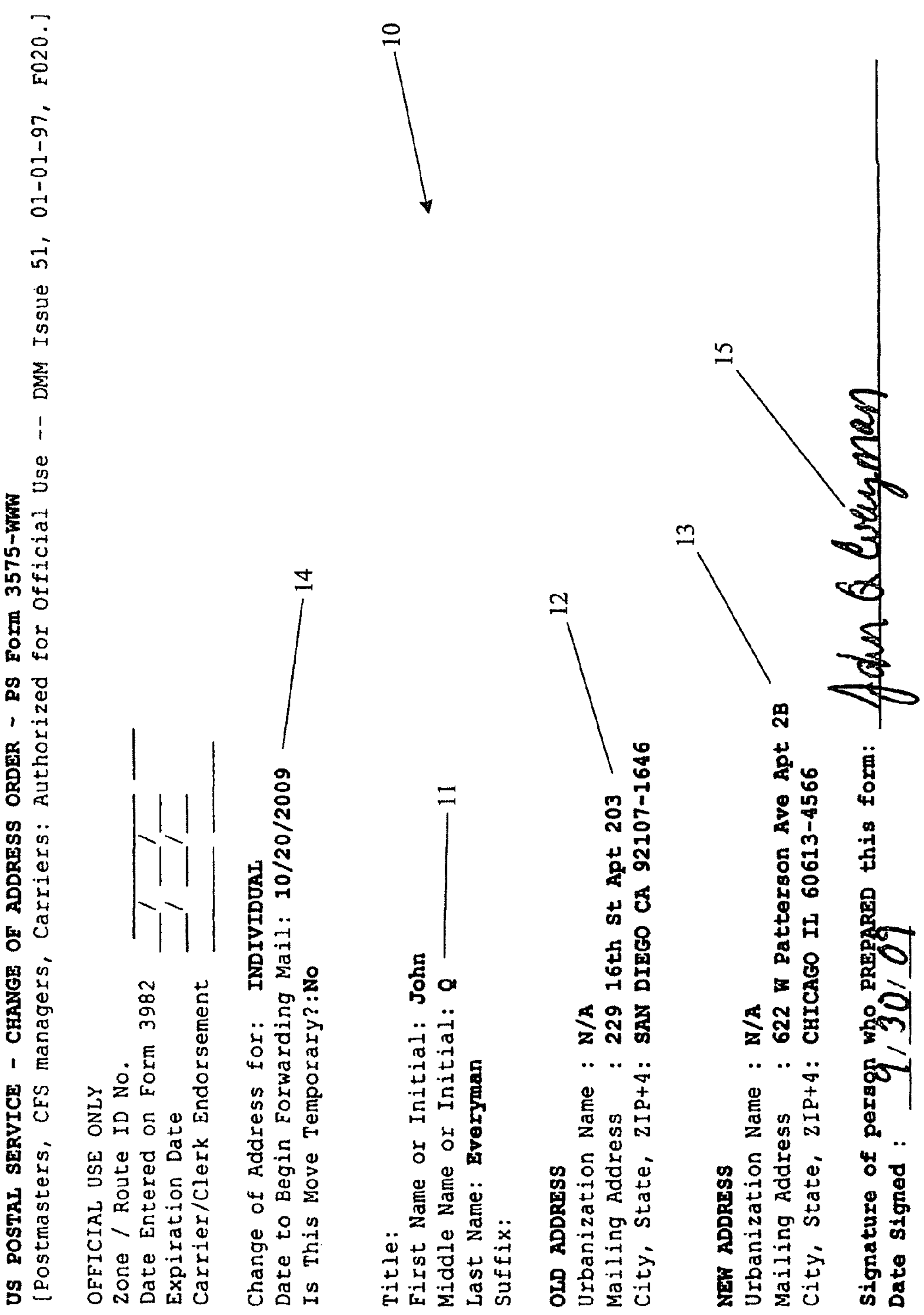
US POSTAL SERVICE - CHANGE OF ADDRESS ORDER - PS Form 3575-WWW
[Postmasters, CFS managers, Carriers: Authorized for Official Use -- DMM Issue 51, 01-01-97, F020.]

OFFICIAL USE ONLY
Zone / Route ID No. ______
Date Entered on Form 3982 __/__/__
Expiration Date __/__/__
Carrier/Clerk Endorsement ______

Change of Address for: INDIVIDUAL
Date to Begin Forwarding Mail: 10/20/2009
Is This Move Temporary?:No

Title:
First Name or Initial: John
Middle Name or Initial: Q
Last Name: Everyman
Suffix:

OLD ADDRESS
Urbanization Name : N/A
Mailing Address : 229 16th St Apt 203
City, State, ZIP+4: SAN DIEGO CA 92107-1646

NEW ADDRESS
Urbanization Name : N/A
Mailing Address : 622 W Patterson Ave Apt 2B
City, State, ZIP+4: CHICAGO IL 60613-4566

Signature of person who PREPARED this form: ______
Date Signed : 9/30/09

*Fig. 1A*

```
Name of Preparer   :  John  Q Everyman
Daytime Phone      : (912) 528-2283      Evening Phone     : N/A
Email Address      :  Everyman@emacom.net

OFFICIAL USE ONLY
Verification Endorsement [                              ]
```

***Give this form to your letter carrier or mail it to the address below:***
CHANGE OF ADDRESS ORDER
ATTN: CARRIER ROUTE # C001
UNITED STATES POSTAL SERVICE
4833 SANTA MONICA AVE
SAN DIEGO CA 92107-9998

NOTE: The person signing this form states that he or she is the person, executor, guardian, authorized officer, or agent of the person for whom mail would be forwarded under this order. Anyone submitting false or inaccurate information on this form is subject to punishment by fine or imprisonment or both under Sections 2, 1001, 1702 and 1708 of Title 18, United States Code.

PRIVACY NOTICE: This information you provide will be used to forward your mail to a new location. Collection is authorized by 39 USC 404. Filing this form is voluntary, but we cannot forward your mail without it. We do not disclose your information, except in the following limited circumstances: to government agencies or bodies as required to perform official duties; to mailers, only if they already possess your old address; in legal proceedings or for service of process; to law enforcement as needed for a criminal investigation; or to contractors who help fulfill the service.

16A

10

*Fig. 1B*

```
Name of Preparer  :  John  Q Everyman
Daytime Phone     : (912) 528-2283      Evening Phone     : N/A
Email Address     :  Everyman@emacom.net

OFFICIAL USE ONLY
Verification Endorsement [                              ]
```

***Give this form to your letter carrier or mail it to the address below:***
CHANGE OF ADDRESS ORDER
ATTN: CARRIER ROUTE # C001
UNITED STATES POSTAL SERVICE
4833 SANTA MONICA AVE
SAN DIEGO CA 92107-9998

NOTE: The person signing this form states that he or she is the person, executor, guardian, authorized officer, or agent of the person for whom mail would be forwarded under this order. Anyone submitting false or inaccurate information on this form is subject to punishment by fine or imprisonment or both under Sections 2, 1001, 1702 and 1708 of Title 18, United States Code.

PRIVACY NOTICE: This information you provide will be used to forward your mail to a new location. Collection is authorized by 39 USC 404. Filing this form is voluntary, but we cannot forward your mail without it. We do not disclose your information, except in the following limited circumstances: to government agencies or bodies as required to perform official duties; to mailers, only if they already possess your old address; in legal proceedings or for service of process; to law enforcement as needed for a criminal investigation; or to contractors who help fulfill the service.

10

16B

*Fig. 2*

METHOD AND SYSTEM FOR MAKING A CHANGE OF ADDRESS

This application claims priority of U.S. provisional application No. 61/102,403, filed Oct. 3, 2008.

FIELD OF THE INVENTION

This invention relates to a system and method for change of postal address for use by a federal postal service such as the United States Postal Service (USPS).

BACKGROUND OF THE INVENTION

The USPS currently accepts change of address (COA) information from customers through a web interface. The postal customer enters all of the necessary information to web-based USPS software. See Basile et al. U.S. Patent Publication No. 20050021856, Jan. 27, 2005. In practice the user is presented with a choice once the COA information has been entered. He or she can complete the transaction and submit the change of address as entered on the web interface. A credit card is used both to verify the identity of the customer and to charge a $1 fee for the online COA service.

Despite the availability of this service, only a small fraction of changes of address are handled online. Consumers react negatively to paying a fee, even a small one, for a service that they can otherwise do for free. Many customers use the paper form the USPS provides, or work through the online COA system to prepare the COA form, then print it out, sign and submit the printed form which then has to be scanned by the postal service, losing the benefit of entering the information online.

The print-out once generated has to be submitted to the postal service by the customer and scanned by the USPS PARS system. The PARS system processes COA forms and intercepts mail for forwarding to the correct new address for customers that have filled out a change order. See Allen et al. U.S. Pat. Nos. 5,422,821 and 5,703,783. Scanning of these print-outs can present problems because of the quality of the customer's printer and/or the scanning devices used. The present invention in one aspect would eliminate the need to scan the entire printout and eliminate the need to process the text on the printouts.

The PARS system currently keeps a database of successful COA records, but nothing exists for rejected COA forms. Rejection may occur for a variety, of reasons such as unreadability, lack of compliance with legal requirements (form unsigned), or data errors such as incorrect address information. Rejected COA forms are currently distributed between different systems for handling. The present invention seeks to improve on handling of paper COA forms, which continue to be popular despite the availability of an online COA system.

SUMMARY OF THE INVENTION

The present invention in one aspect consolidates COA reject data to a central location and provides reports and queries that allow analysis of this data and to answer customer complaints as to why their change was not processed. In another aspect the invention provides an improved process for handling of the printed or handwritten COA forms. A paper COA form is generated by hand or use of the USPS online COA system. The paper form includes indicia such as a bar code which aids in determining the contents of the form when it is scanned. As is done in known input-output subsystems for video coding of mail that did not scan correctly, the scanned data is assigned an identifier which identifier is printed as a bar code on the paper form. The identifier is used as described below for associating the data entered into the web based COA system by the postal recipient with the identifier so that a full OCR scan of the form is not necessary.

A method of making a change of address for a postal recipient for delivery of mail by a federal postal service according to a first aspect of the invention includes steps of:

entering change of address information into a computerized change of address system, which information includes the name of a postal recipient submitting the change, an old address where the postal recipient currently receives mail, a new address at which the postal recipient is to receive mail in the future, and an indication of the effective date of the change;

storing the entered address information in machine readable form;

printing out a change of address form having the entered change of address information printed thereon in human readable form and having a machine scannable identifier printed thereon which identifies that form to the system;

signing the printed change of address form such that the recipient's hand written signature appears on the printed form;

submitted the signed printed form to the postal service;

scanning the signed printed form to read the identifier;

associating the stored COA data with the read identifier;

validating the stored COA data; and then entering the change of address data to a change of address database used by the postal service.

According to a second aspect of the invention, a method of making a change of address for a postal recipient for delivery of mail by a federal postal service includes the steps of:

entering change of address information into a computerized change of address system, which information includes the name of a postal recipient submitting the change, an old address where the postal recipient currently receives mail, a new address at which the postal recipient is to receive mail in the future, and an indication of the effective date of the change;

storing the entered address information in machine readable format;

converting the change of address information into a scannable code;

printing out a change of address form having the entered change of address information in human-readable alphanumeric form and the scannable code each printed thereon;

signing the printed change of address form such that the recipient's hand written signature appears on the printed form;

submitting the signed printed form to the postal service;

scanning the signed printed form to read the scannable code;

validating the COA data contained in the scannable code; and then entering the change of address data to a change of address database used by the postal service.

A system for making a change of address in accordance with the foregoing methods includes suitable means for carrying out the required steps, such means including a computer with software for printing out the COA form with the printed identifier or the encoded COA. A scanner is used by the postal service to image the form, and software is used by the postal service to process the COA information.

The invention further provides a database of information concerning rejected change of address forms. Such database is embodied in one or more processor-readable media having stored thereon processor-readable code including a COA reject data base, which database contains data records of COA forms submitted by postal recipients which have been rejected for COA processing due to one or more errors in completion of data fields of the COA form by the postal recipient submitting the form to the postal service, each of which records includes information concerning a change of mail delivery address requested by a postal recipient.

These and other aspects of the invention are described further in the detailed description that follows It is to be understood that terms used herein not otherwise defined should be given their meanings recognized in the postal arts, if applicable, not more general definitions found in dictionaries.

BRIEF DESCRIPTION OF THE DRAWING

In the accompanying drawing:

FIGS. 1A and 1B are upper and lower halves respectively of a diagram of a computer printed change of address form with a bar code identifier on the lower half.

FIG. 2 is a diagram of the lower half of a computer printed change of address form with a with a two-dimensional bar code identifier printed on it, the upper half being the same as shown in FIG. 1A.

DETAILED DESCRIPTION

Figure 3:
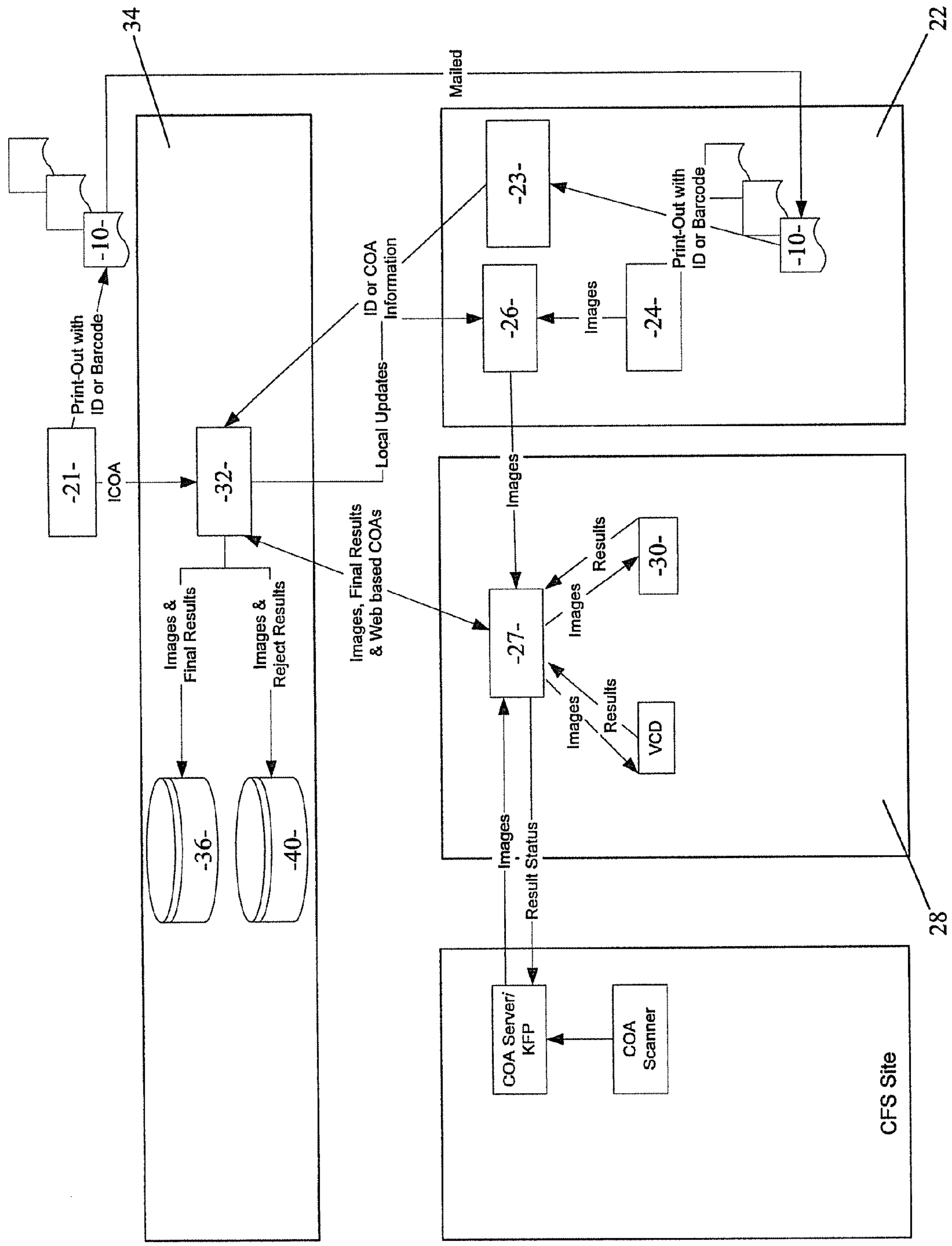
FIG. 3 is a schematic diagram of a change of address system including a reject database according to the invention.

This invention enhances a web based change of address process on two levels. The first is that it makes it easier to capture and recover COA data information from the web in situations where the customer does not wish to complete the online COA process. The second is that it provides a central database of reject information to assist with error analysis and customer complaints.

In order to avoid full scanning and processing of the COA printouts, two methods can be incorporated. The first is to capture the COA information entered by the customer when they elect to print the data rather than complete the online COA process. This information is assigned a unique identifier and then stored for later access. When the COA form is printed, it will include the identifier either as a set of printed numbers or a code such as a bar code. In FIGS. 1A, 1B, the image of a printed COA form 10 has been completed with the name 11 of the postal recipient, the old address information 12, the new address information 13, and among other things the effective date of the change 14 and the signature 15 of the postal recipient. A bar code 16A is added to the image, which bar code indicates the identifier that was assigned and stored when the form was scanned.

When the print-out 10 is sent in and received by the postal service, only the code 16A has to be entered (bar code scanned) to retrieve the information captured from the web. The system that stores the data can then create a COA record from this data. The print-out does not need to be scanned and fully processed, which process is susceptible to errors and often requires manual data entry to correct errors and omissions. According to this aspect of the invention, the data entered through the web interface is used even though the postal recipient has opted not to use the online COA system.

A second method according to the invention is to capture the COA information entered via the web-based COA system and encode it into a 2D bar code 16B (FIG. 2). This 2D bar code 16B is printed when the postal recipient finishes entering the data but opts not to pay the fee and submit the change of address using the online system. When the COA form is received, the 2D bar code 16B is scanned and the information contained sent to a system that then creates a COA record from this data. This eliminates the need to store the data at the time of entry and likewise eliminates a step of using OCR on the printed information on the form, except as a backup in the event the 2D bar code does not read properly. Likewise the OCR data from the form can be used as the primary source for the COA information, and the 2D barcode is used for confirmation or completing a data field that did not scan successfully. By this means the postal service need not rely entirely on OCR of the printed characters on the form.

According to another aspect of the invention, the automated COA system further includes a COA reject database would be an archive system of records that could not be processed because they did not contain enough information or could not be processed due to a USPS rule or regulation. COA rejects are currently removed from the system at one of the many different subsystems that make up PARS. Depending on the subsystem, it can be difficult to find information on the rejects. By incorporating a reject database according to the invention, all rejects can be sent to a central location stored and later accessed. Since each reject often has an image associated with it, this could also be included in the database together with essential fields including fields for recipient name, current (old) recipient address, new recipient address, and effective date of mail forwarding to the new address. The primary key for records in the COA reject database would be a unique COA identifier (in the CFPS, the Transaction ID.)

The online COA system offered by the postal service validates the new and old address, i.e. determines that the addresses exist and are valid ones for the postal recipient. For example, the online COA system will not permit a new address that corresponds to a well known landmark that could not be a valid residential address, e.g. 1060 W Addison St Chicago, Ill. 60613 (beautiful Wrigley Field, home of the Chicago Cubs.) When a paper form is submitted, errors of this kind can occur, in addition to the extra difficulty presented by OCR of hand written characters, even if the underlying data is all correct.

In accordance with the invention, the COA reject database has data fields for each of the data elements that are required for a valid change of address, that is name of postal recipient, old address, new address, and effective date of the change, with other conditions possible, such as a temporary change during which mail is to be forwarded. Errors in the paper COA form could include insufficient information to determine the old or new address, failure to complete a required field, an invalid address as discussed above, and the like. Preferably the database of the invention further includes a field specifying the reason(s) why the COA form was rejected, such as one or more of a number of listed error codes.

The reject database can be used as a tool for follow-up in response to a customer inquiry as to why mail is not being forwarded. In response to a customer call, a customer service representative (CSR) looks up the customer information to determine if a COA was received and rejected, and can advise the postal recipient what needs to be done to correct the problem, for example, resubmit the form with valid address information, or if the customer failed to sign the form, advise the customer to resubmit the change of address with the required signature. The use of a code for the reason for COA rejection can aid the postal service in determining the kinds and frequency of address change problems that occur and take steps to remedy a problem such as by making changes to the printed form to make the signature requirement more prominent.

The reject database will thus be used to handle customer complaints/queries as to why their change of address was not processed. The software for accessing the reject database permits searches and queries by human users. It would be possible to allow postal recipients to view their change of address information online in order to determine that there was a problem with the change of address without involving a human CSR.

The rejected record and image would be matched and queries developed to help find the applicable record and/image. The queries would include the identifier of the record, customer name(s), old address, new address and ZIP codes. Additional queries would be included to help analyze the rejects to look for system improvements and defects. These queries would be based on processing location, reject reasons and operator identifiers.

If a correction to the rejected COA information can be made, then the COA could then be automatically sent into the PARS system for final processing. FIG. 3 illustrates a reject database 40 according to the invention used in conjunction with the PARS system 20.

A number of postal acronyms are used to describe components of the change of address functions of the PARS system in use by the USPS. The following abbreviations known in the postal arts and some are referred to herein and in FIG. 3:

| Acronym | Definition |
|---|---|
| CAL | Client Access Layer |
| CARS | Change of Address Record Server |
| CFPS | COA Forms Processing System |
| CFR | COA Forms Reader |
| CFS | Computerized Forwarding System |
| CIOSS | Combined Input Output Subsystem |
| CIX | COA Import Export |
| COA | Change Of Address |
| COARS | Change Of Address Reporting System |
| COOL | Combined Online/Offline |
| COPI | Court-Ordered Protected Individual |
| CPADS | Current PAD records |
| DAL | Data Access Layer |
| DBI | Database Interface |
| DIRGEN | Directory Generation |
| DML | Data Management Layer |
| DNF | Do Not Forward |
| ECR | Engineering Change Request |
| FCS | Forwarding Control System |
| ICOA | Internet Change Of Address |
| ID | Identification; Identifier |
| IF; I/F | Interface (used only in identifying interfaces) |
| IMS | Image Management System |
| IP | Internet Protocol |
| KFP | Key From Paper |
| MDUP | Modified Duplicate |
| MLNA | Moved Left No Address |
| MNS | Managed Network System |
| MTSC | Maintenance Technical Support Center |
| NCA | New Change of Address |
| NCED | National Center for Employee Development |
| NCOA | National Change Of Address |
| NCSC | National Customer Support Center |
| NDSS | National Directory Support System |
| OAS | Oracle Application Server |
| P&DC | Processing and Distribution Center. |
| PAD | PARS Address Database |
| PARS | Postal Automated Redirection System |
| PCOA | PARS Change Of Address |
| RAC | Real Application Cluster |
| RAID | Redundant Array of Inexpensive Disks |
| REC | Remote Encoding Center |

-continued

| Acronym | Definition |
|---|---|
| RIC | Redirection Image Controller |
| RTM | Requirements Traceability Matrix |
| SEQ | COA Sequence Number |
| SOAP | Simple Object Access Protocol |
| SQL | Structured Query Language |
| TAR | Technical Analysis Report |
| TCP | Transmission Control Protocol |
| UCOA | Update Change Of Address |
| USL | Utility and Support Layer |
| USPS | United States Postal Service |
| VCD | Video Coding Desk |
| W3C | World Wide Web Consortium |
| WABCR | Wide Area Bar Code Reader |

Referring to FIG. 3, a printed COA form 10 is generated as a postal recipient uses the COA web site 21. The form is printed with a bar code 16A or 16B or an identifier that can be read in lieu of bar code 16A. The printed form is mailed or delivered to a postal service P&DC site 22, generally the one associated with the zip code of the postal recipient's old address. The form 10 is scanned by a scanner 23 at P&DC site 22 and a CIOSS system 24 captures images of the forms and forwards them to a further RIC 26 which in turn forwards the images to a RIC 27 of a REC site 28. A CFR 30 evaluates the image data and the results and image data for each COA form 10 are electronically forwarded to a further RIC 32 at the USPS NCSC site 34. Images and final results for valid changes of address are forwarded to a COARS database 36 as in the existing PARS system, however image data and final results for rejected COA forms is sent instead to a reject database 40 according to the invention which can be accessed via the web or other means by the postal recipient who filed the COA form or by a postal worker with a need to access the data for reasons such as those mentioned above. In this manner the reject database 40 is stored at a central location such as the NCSC 34 and can be accessed remotely though the web or other means such as a direct remote connection.

Although several embodiments of the present invention have been described in the foregoing detailed description and illustrated in the accompanying drawings, it will be understood by those skilled in the art that the invention is not limited to the embodiments disclosed but is capable of numerous rearrangements, substitutions and modifications without departing from the spirit of the invention. For example, a free standing software program could be used by postal recipients to create the printed COA form in place of a web based system. Such modifications are within the scope of the invention as expressed in the appended claims.

The invention claimed is:

1. A method of making a change of address for a postal recipient for delivery of mail by a federal postal service, comprising:

receiving change of address (COA) information into a computerized change of address system, which information includes the name of a postal recipient submitting the change, an old address where the postal recipient currently receives mail, a new address at which the postal recipient is to receive mail in the future, and an indication of the effective date of the change;

storing the received address information in machine readable form as COA data;

printing out a change of address form having the received change of address information printed thereon in human readable form and having a machine scannable identifier printed thereon which identifies that form to the system;

scanning the printed form using a scanner device to read the identifier after the printed form has been signed by the postal recipient;

associating the stored COA data with the read identifier by the system;

validating the stored COA data by the system; and storing the validated COA data to a change of address database used by the postal service.

2. The method of claim 1, wherein validating the stored COA data includes determining if the new address corresponds to an address that cannot be a residential address.

3. The method of claim 1, wherein if the stored COA data cannot be validated, then the stored COA data is entered into a COA reject database.

4. The method of claim 3, wherein a reason the stored COA data could not be validated is also stored in the COA reject database.

5. A method of making a change of address for a postal recipient for delivery of mail by a federal postal service, comprising:

receiving change of address (COA) information into a computerized COA system, which information includes the name of a postal recipient submitting the change, an old address where the postal recipient currently receives mail, a new address at which the postal recipient, and an indication of the effective date of the change;

storing the entered COA information in machine readable form;

converting the COA information into a non-alphanumeric scannable code by the system;

printing out a COA form having the entered change of address information in human-readable alphanumeric form and the scannable code each printed thereon;

scanning the printed COA form using a scanning device to read the scannable code after the printed COA form has been signed by the postal recipient;

validating the COA information contained in the scannable code by the system; and then entering the validated COA data to a change of address database used by the postal service.

6. The process of claim 5, wherein the scannable code is a two-dimensional bar code.

7. The method of claim 5, wherein validating the COA information contained in the scannable code includes determining if the new address corresponds to an address that cannot be a residential address.

8. The method of claim 5, wherein if the COA information contained in the scannable code cannot be validated, then the COA information is entered into a COA reject database.

9. The method of claim 8, wherein a reason the COA information could not be validated is also stored in the COA reject database.

10. One or more processor-readable media having stored thereon processor-readable code including a COA reject data base, which database contains data records of COA forms submitted by postal recipients which have been rejected for COA processing due to one or more errors in completion of data fields of the COA form by the postal recipient submitting the form to the postal service, each of which records includes information concerning a change of mail delivery address requested by a postal recipient.

11. The processor-readable media of claim 10, wherein the data records each include a scanned image of the COA form submitted by the postal recipient.

12. The processor-readable media of claim 10, wherein the data records each include fields for recipient name, old recipient address, new recipient address, and effective date of mail forwarding to the new address.

13. The processor-readable media of claim 12, wherein the data records each include data indicating a reason that the COA form was rejected.

* * * * *